United States Patent
Uchida et al.

(10) Patent No.: US 9,701,874 B2
(45) Date of Patent: Jul. 11, 2017

(54) CONDUCTIVE ADHESIVE, ANISOTROPIC CONDUCTIVE FILM, AND ELECTRONIC DEVICE USING SAME

(71) Applicant: SHOWA DENKO K.K., Tokyo (JP)

(72) Inventors: Hiroshi Uchida, Tokyo (JP); Yoshitaka Ishibashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/781,746

(22) PCT Filed: Mar. 27, 2014

(86) PCT No.: PCT/JP2014/059021
§ 371 (c)(1),
(2) Date: Oct. 1, 2015

(87) PCT Pub. No.: WO2014/162990
PCT Pub. Date: Oct. 9, 2014

(65) Prior Publication Data
US 2016/0060490 A1    Mar. 3, 2016

(30) Foreign Application Priority Data

Apr. 2, 2013  (JP) ................................ 2013-077137

(51) Int. Cl.
| C09J 9/02 | (2006.01) |
| C09J 133/14 | (2006.01) |
| C09J 163/10 | (2006.01) |
| H01B 1/22 | (2006.01) |
| C09D 133/06 | (2006.01) |
| C09J 7/00 | (2006.01) |
| C08K 3/08 | (2006.01) |
| C08K 7/18 | (2006.01) |

(52) U.S. Cl.
CPC ............ *C09J 9/02* (2013.01); *C09D 133/068* (2013.01); *C09J 7/00* (2013.01); *C09J 133/14* (2013.01); *C09J 163/10* (2013.01); *H01B 1/22* (2013.01); *C08K 3/08* (2013.01); *C08K 7/18* (2013.01); *C08K 2003/085* (2013.01); *C08K 2003/0806* (2013.01); *C08K 2003/0831* (2013.01); *C08K 2003/0862* (2013.01); *C09J 2201/602* (2013.01); *C09J 2203/326* (2013.01); *C09J 2205/102* (2013.01); *C09J 2433/00* (2013.01); *C09J 2463/00* (2013.01)

(58) Field of Classification Search
CPC ......... C09J 4/00; C09J 9/02; C09J 7/00; C09J 163/10; C09J 133/14; C09J 2205/102; C09J 2201/602; C09J 2203/326; C09J 2433/00; C09J 2463/00; C09D 133/068; H01B 1/22; C08K 7/18; C08K 2003/0862; C08K 2003/0806; C08K 2003/0831; C08K 2003/085; C08K 3/08
See application file for complete search history.

(56) References Cited

U.S. PATENT DOCUMENTS

| 2004/0127626 | A1* | 7/2004 | Yoshiko ................. H05K 3/321 |
| | | | 524/440 |
| 2008/0097010 | A1 | 4/2008 | Kuroda |
| 2009/0078747 | A1* | 3/2009 | Park ......................... C09J 4/00 |
| | | | 228/249 |
| 2009/0131607 | A1 | 5/2009 | Nakanishi et al. |
| 2011/0263882 | A1 | 10/2011 | Uchida |
| 2012/0256326 | A1* | 10/2012 | Mitsukura ........... H01L 21/6836 |
| | | | 257/798 |
| 2012/0302775 | A1 | 11/2012 | Uchida et al. |

FOREIGN PATENT DOCUMENTS

| CN | 1997682 | A | 7/2007 |
| CN | 101291971 | A | 10/2008 |
| CN | 101600295 | A | 12/2009 |
| CN | 102079847 | A | 6/2011 |
| CN | 102264712 | A | 11/2011 |
| JP | 2000-169821 | A | 6/2000 |
| JP | 2000-192000 | A | 7/2000 |
| JP | 2000-281914 | A | 10/2000 |
| JP | 2009-007453 | A | 1/2009 |
| JP | 2009-299011 | A | 12/2009 |

(Continued)

OTHER PUBLICATIONS

Bajpai et al, Film performance and UV curing of epoxy acrylate resins, Progress in Organic Coatings, vol. 44, Issue 4, Aug. 2002, pp. 271-278.*
Epoxy Resins, Reactive Flame Retardants, Hardeners, Thermosetting Resin, 13th Edition, Nippon Kayaku, pp. 1-18, no publication date given, obtained online from: https://www.nipponkayaku.co.jp/english/company/business/functional-chemicals/files/EpoxyResins.pdf.*

(Continued)

*Primary Examiner* — Alexander Kollias
(74) *Attorney, Agent, or Firm* — Sughrue Mion, PLLC

(57) ABSTRACT

[Problem] To provide: a conductive adhesive which contains an epoxy (meth)acrylate resin and which can form a bonded zone that is not susceptible to being deteriorated by halogen; an anisotropic conductive film; and electronic devices using both. [Solution] A conductive adhesive and an anisotropic conductive film which each contain a conductive filler and a binder resin, wherein: the binder resin comprises an epoxy (meth)acrylate resin that is a product of addition reaction of (meth)acrylic acid and an epoxy compound having a sum of total chlorine atom concentration and total bromine atom concentration of 300 mass ppm or less, preferably 50 mass ppm or less; and the conductive filler is dispersed in the binder resin which comprises such an epoxy (meth)acrylate resin. The epoxy (meth)acrylate resin is preferably prepared by subjecting a starting compound (substrate) having a carbon-carbon double bond to epoxidation of the double bond with an oxidizing agent consisting of hydrogen peroxide, and then subjecting the obtained epoxy compound to addition reaction with (meth)acrylic acid.

17 Claims, 4 Drawing Sheets

(56) References Cited

FOREIGN PATENT DOCUMENTS

| JP | 2010-235649 A | 10/2010 | | |
|---|---|---|---|---|
| JP | 2012-186448 A | 9/2012 | | |
| JP | 2013-012498 A | 1/2013 | | |
| KR | 10-2009-0030626 A | 3/2009 | | |
| KR | 10-2012-0065397 A | 6/2012 | | |
| KR | 10-2012-0066672 A | 6/2012 | | |
| WO | 2011/058904 A1 | 5/2011 | | |
| WO | WO 2011/058996 | * | 5/2011 | ............ H01L 21/52 |
| WO | 2013/035164 A1 | 3/2013 | | |

OTHER PUBLICATIONS

STN Search Report, pp. 1-9, Jul. 2016.*
International Search Report for PCT/JP2014/059021 dated Jun. 17, 2014.
First Office Action dated May 19, 2016 from the State Intellectual Property Office of the P.R.C. in counterpart application No. 201480018996.7.
Extended European Search Report dated Oct. 5, 2016 from the European Patent Office in counterpart application No. 14778798.0.
Communication dated Dec. 30, 2016 from the State Intellectual Property Office of the P.R.C., in counterpart Chinese application No. 201480018996.7.
Communication dated Mar. 20, 2017, issued by the Korean Intellectual Property Office in corresponding Korean Application No. 10-2015-7026108.

* cited by examiner

CONDUCTIVE ADHESIVE, ANISOTROPIC CONDUCTIVE FILM, AND ELECTRONIC DEVICE USING SAME

CROSS REFERENCE TO RELATED APPLICATIONS

This application is a National Stage of International Application No. PCT/JP2014/059021 filed Mar. 27, 2014, claiming priority based on Japanese Patent Application No. 2013-077137 filed Apr. 2, 2013, the contents of all of which are incorporated herein by reference in their entirety.

TECHNICAL FIELD

The present disclosure relates to a conductive adhesive, an anisotropic conductive film, and an electronic device using the same.

BACKGROUND ART

Recently, conductive adhesive, instead of solder, is widely used for assembling a semiconductor element or various electrical/electronic components, or for adhering them to a substrate.

For example, the following patent document 1 describes a conductive adhesive having a sufficient strength and conductivity, the adhesive comprising metal fillers containing copper, an epoxy compound, a novolak phenolic resin, a low molecular weight polyphenolic compound, and a curing agent, as indispensable components. Further, Patent Document 2 describes a conductive adhesive having a superior adhesion strength, the adhesive containing an epoxy resin and a phenolic resin which are liquid at a room temperature.

Further, an anisotropic conductive film having conductive particles dispersed in a resin may also be used for electrical connection between circuit substrates, or between an electronic component, such as an IC chip, and a circuit substrate. The anisotropic conductive film is arranged between electrodes of the electronic components opposing to each other, and heat and pressure are applied thereto, so that the electrodes can be adhered and electrically connected to have conductivity in the pressurization direction.

As an example of such an anisotropic conductive film, for example, Patent Document 3 discloses an anisotropic conductive film comprising a laminate of a first adhesive film layer and a second adhesive film layer, the first adhesive film layer containing a polymerized photopolymerizable resin, a thermosetting resin, a curing agent for the thermosetting resin, and conductive particles, and the second adhesive film layer containing a thermosetting resin, and a curing agent for the thermosetting resin. Patent Document 4 discloses an anisotropic conductive film comprising conductive particles dispersed in an insulative adhesive containing a silane coupling agent.

There has been a demand for mounting components on a wiring pattern prepared by applying photolithography on an aluminum- or copper-foil clad PET (polyethylene terephthalate) film, or prepared by screen printing or stencil printing using a silver paste. However, if a conventional epoxy conductive adhesive is used, the adhesive strength is high, but curing at a low temperature is difficult because such an epoxy conductive adhesive usually heated at a high temperature of 160 to 200° C. in order to obtain both the preservation stability and the curability. When the thermosetting conductive adhesive is cured at a low temperature of approximately 150° C., connection is possible, but sufficient connection reliability cannot be easily obtained because the resin has a low moisture resistance and heat resistance.

Therefore, it has been desired that a thermosetting conductive adhesive has not only a superior adhesive property and connection reliability, but also curability at a low temperature. For example, Patent Document 5 discloses an anisotropic conductive adhesive containing conductive particles dispersed in an adhesive resin composition which comprises a polyester resin having a glass transition temperature of 40° C. or less, blocked isocyanate (B), epoxy acrylate (C), and a polymerization initiator (D).

The epoxy acrylate used herein is synthesized using an epoxy resin as a raw material and reacting the epoxy resin with a (meth)acrylic acid. The epoxy resin, i.e., raw material, contains organic chlorine derived from epichlorohydrin, and the epoxy acrylate has a higher viscosity than the epoxy resin. Unlike the epoxy resin, the epoxy acrylate cannot be mixed with a liquid curing agent having a low viscosity. Accordingly, this may cause problems in mixing conductive particles, particularly in case of a conductive adhesive in which conductive particles such as silver are mixed at a high concentration. There are problems that if polyfunctional (meth)acrylic acid ester is mixed in order to lower the viscosity, the adhesive property is decreased, and if monofunctional (meth)acrylic acid ester is mixed therefor, both the heat resistance and the adhesive property are decreased.

PRIOR ARTS

Patent Document

Patent Document 1: Japanese Unexamined Patent Publication (Kokai) No. 2000-192000
Patent Document 2: Japanese Unexamined Patent Publication (Kokai) No. 2009-7453
Patent Document 3: Japanese Unexamined Patent Publication (Kokai) No. 2013-12498
Patent Document 4: Japanese Unexamined Patent Publication (Kokai) No. 2012-186448
Patent Document 5: Japanese Unexamined Patent Publication (Kokai) No. 2009-299011

SUMMARY

As mentioned above, in the prior arts, there are drawbacks that significant migration occurs due to halogen caused the organic chlorine contained in the epoxy compound (resin) used therein, and thus, reliability of the conductive adhesive cannot be obtained. Further, there are also drawbacks such that a mixture applicable for a substrate having a low heat resistance, such as PET, and having a good balance between the heat resistance and the adhesive property, cannot be obtained.

One of the objectives of the present disclosure is to provide a conductive adhesive using a epoxy (meth)acrylate resin capable of preventing deterioration by halogen at the adhered portion and capable of being cured at a low temperature, as well as an anisotropic conductive film, and an electronic device using the same.

In order to attain the above objective, one aspect of the present disclosure is a conductive adhesive comprising conductive fillers and a binder resin, the binder resin comprising an epoxy (meth)acrylate resin, and the epoxy (meth)acrylate resin being formed by adding a (meth)acrylic acid to an epoxy compound having the sum of total chlorine atom concentration and total bromine atom concentration of 300 mass ppm or less.

The sum of total chlorine atom concentration and total bromine atom concentration, in the total amount of the epoxy compound is preferably 50 mass ppm or less.

A raw material for the epoxy (meth)acrylate resin is preferably an epoxy compound obtained by epoxidizing a carbon-carbon double bond of a raw material compound (substrate) having a carbon-carbon double bond, using a peroxide as an oxidant.

The raw material compound (substrate) is preferably a compound having two or more allyl ether groups.

The content of the binder resin in the conductive adhesive is preferably 5 to 90% by mass.

The conductive filler is preferably a particle or a fiber made of at least one kind of metal, or an alloy of a plurality of kinds of metal selected from a group of gold, silver, copper, nickel, aluminum, and palladium; a metal particle or fiber the surface of which is plated with gold, palladium, or silver; a resin core ball having a resin ball plated with nickel, gold, palladium, or silver; a carbon or graphite particle or fiber; or the metal particle, the core ball, the carbon or graphite particle the surface of which is coated with an insulation resin thin film.

Another aspect of the present disclosure is an electronic device comprising a substrate on which a semiconductor element, a solar panel, a thermoelectric element, a chip part, a discrete part, or a combination of these are mounted.

Still other aspect of the present disclosure is an electronic device in which a wiring pattern of a film antenna, a keyboard membrane, a touch panel, a RFID antenna is formed and connected to a substrate.

Still other aspect of the present disclosure is an anisotropic conductive film comprising conductive particles and a binder resin, the binder resin comprising an epoxy (meth) acrylate resin, the epoxy (meth)acrylate resin being formed by adding a (meth)acrylic acid to an epoxy compound having the sum of a total chlorine atom concentration and a total bromine atom concentration of 300 mass ppm or less, and 0.1 to 20% by mass of conductive particles being dispersed in the binder resin.

The epoxy compound preferably has the sum of a total chlorine atom concentration and a total bromine atom concentration of 50 mass ppm or less.

Further, the epoxy (meth)acrylate resin is preferably formed from an epoxy resin obtained by using a raw material compound (substrate) having a carbon-carbon double bond, and by epoxidizing the carbon-carbon double bond using a peroxide as an oxidant.

The raw material compound (substrate) is preferably a compound having two or more allyl ether groups.

Further, the conductive particle used is at least one kind of metal, or an alloy of a plurality of kinds of metal selected from a group of gold, silver, copper, nickel, aluminum, and palladium; a metal particle the surface of which is plated with gold, palladium, or silver; a resin core ball having a resin ball plated with nickel, gold, palladium, or silver; a carbon or graphite particle; or the particle as mentioned above the surface of which is coated with an insulation resin thin film.

Still other aspect of the present disclosure is an electronic device in which electronic components are connected by anisotropic conductive connection.

EMBODIMENT

Figure 1:
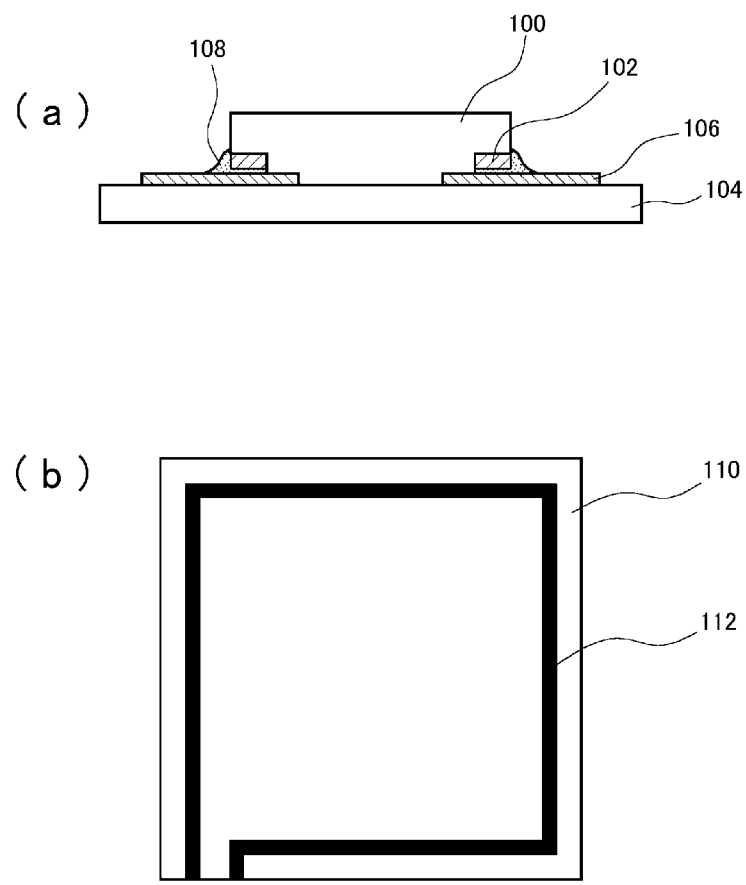
FIG. 1 is a view showing an example of an electronic device in which a conductive adhesive according to the first aspect of the disclosure is used.

Hereinbelow, an exemplary embodiment of the present invention (hereinafter, referred to as an embodiment) will be described.
(First Aspect of Disclosure)

A conductive adhesive according to a first aspect of the disclosure contains conductive fillers and a resin functioning as a binder, the binder resin containing an epoxy (meth) acrylate resin, and the epoxy (meth)acrylate resin being formed by adding a (meth)acrylic acid to an epoxy compound having the sum of a total chlorine atom concentration and a total bromine atom concentration of 300 mass ppm or less.

The sum of the total chlorine atom concentration and the total bromine atom concentration in the total amount of the epoxy compound is preferably 50 mass ppm or less, and more preferably 10 mass ppm or less.

Here, a raw material compound (substrate) having a carbon-carbon double bond is epoxidized, by epoxidizing the carbon-carbon double bond using a peroxide as an oxidant, to thereby obtain an epoxy compound. A (meth) acrylic acid is added to the obtained epoxy compound, i.e., raw material, and thereby, the epoxy (meth)acrylate resin can be obtained. Unlike the conventional epoxy resin production method using epihalohydrin, the present method does not use a compound having a carbon-halogen (chlorine, bromine) bond as a raw material. The epoxy (meth)acrylate resin functioning as a binder and constituting a conductive adhesive according to the first aspect of the disclosure, is substantially free from a compound having a carbon-halogen (chlorine, bromine) bond in a molecule. Therefore, an excessive purification process for removing halogens derived from epihalohydrin contained in the conventional epoxy resin is not necessary. In this specification, the term "substantially free from" means that a compound having a carbon-halogen (chlorine, bromine) bond is not used as raw material for synthesizing an epoxy (meth)acrylate resin, in other words, the content of such a compound and a reaction product thereof in the epoxy (meth)acrylate resin is zero. The oxidant may be hydrogen peroxide, peracetic acid, etc., and the hydrogen peroxide is preferable because it is not expensive and it can be handled easily. In view of the reactive property and the easiness in handling, the use of a 10 to 60% by mass aqueous solution of hydrogen peroxide is particularly preferable. According to the present method, the raw material does not contain a chlorine atom and a bromine atom, and thus, an epoxy (meth)acrylate resin having a low content of free chlorine and bromine, can be obtained.

In the present specification, the "epoxy (meth)acrylate resin" is a binder component of the conductive adhesive, i.e., a compound formed by adding an acrylic acid or a methacrylic acid to an oxirane ring and capable of constituting a cured material, the compound being any of a monomer, an oligomer, and a polymer.

The raw material compound (substrate) having a carbon-carbon double bond and used for synthesizing an epoxy compound, the epoxy compound being a raw material for the epoxy (meth)acrylate resin according to the first aspect of the disclosure, may be cycloalkane having a carbon number of 4 to 12, nonconjugated cycloalkadiene having a carbon number of 6 to 12, cycloalkatriene, cycloalkatetraene, or a compound having an allyl ether group. The allyl ether group is a functional group represented by CH₂=CH—CH₂—O—.

Such a raw material compound (substrate) may be phenyl allyl ethers, cresol monoallyl ethers, cyclohexenes, cyclooctenes, etc., and examples thereof may be bisphenol A diallyl ether, an allyl ether compound of a novolak phenolic resin, cyclohexanedimethanol diallyl ether, trimethylolpropane triallyl ether, pentaerythritol tetraallyl ether, 3,4-epoxy cyclohexane-1-carboxylic acid allyl ester, 3,4-cyclohexenylmethyl-3',4'-cyclohexene carboxylate, or the like.

Among them, the use of a compound having two or more allyl ether groups is preferable. Producing an epoxy resin by using a compound having two or more allyl ether groups as a raw material has advantages not only that the mixing of chlorine can be significantly reduced, but also that the viscosity can be reduced compared to the ordinary case where the epoxy resin is produced using epichlorohydrin. In case that the epoxy resin is produced using epichlorohydrin, when a hydroxyl group is added to the epichlorohydrin, addition from the terminal (normal addition) always accompanies addition from the opposite side (abnormal addition) as a side reaction.

[Chemical Formula 1]

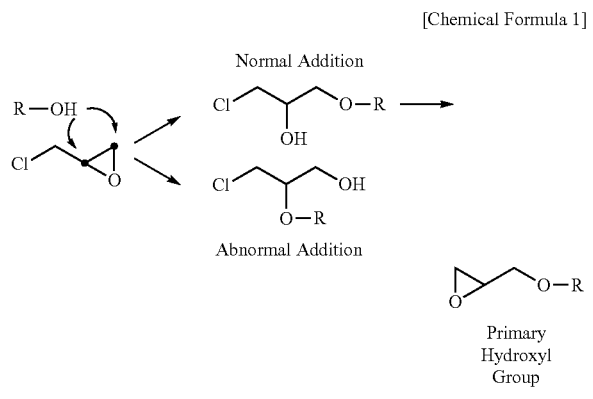

This side reaction is remarkable in case of an aliphatic epoxy resin which can particularly decrease the viscosity. In case of the aliphatic epoxy, there are drawbacks that the chlorine remains, and in addition, the reactive property of the generated primary alcohol, i.e., by-product, is substantially same as the reactive property of the hydroxyl group of the raw material (usually, primary alcohol), and thus, the epichlorohydrin also reacts to the by-product, leading to the increase in the molecular weight and increase in the viscosity.

[Chemical Formula 2]

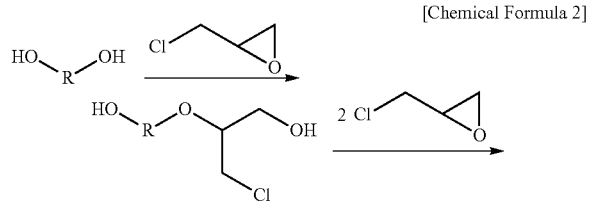

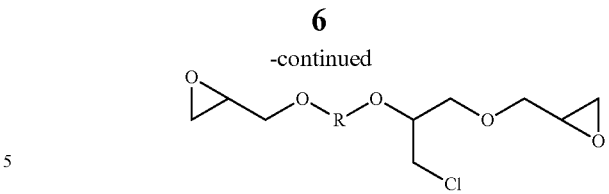

When an aromatic compound is used as a raw material, the phenolic hydroxyl group of the raw material is different from the alcoholic hydroxyl group of the by-product, and thus, the above problems do not easily occur. However, in contrast, the epoxy group of the generated product easily reacts to the phenolic hydroxyl group of the raw material. Therefore, there are drawbacks that below-mentioned side reaction occurs at a certain ratio, leading to the increase in viscosity.

[Chemical Formula 3]

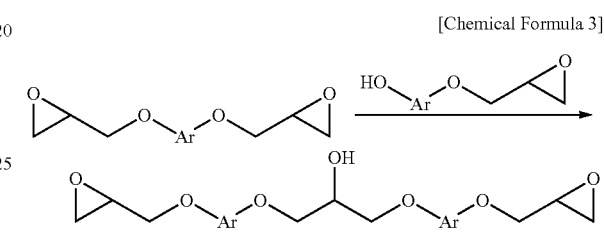

On the other hand, in case that a polyvalent allyl ether is used as a raw material, and expoxidization is performed using hydrogen peroxide thereto, the hydroxyl group can be regarded as being protected by the allyl ether. Thus, the above-mentioned problems do not occur and the allyl ether remains as a by-product, as shown below. In this case, the viscosity becomes lower than diglycidylether, and thus, this is superior not only in terms of the problem regarding chlorine, but also in terms of mixing conductive particles of such as Ag.

[Chemical Formula 4]

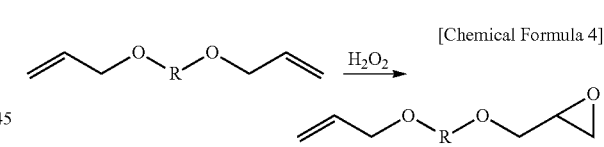

The compound having two or more allyl ether groups may be, for example, a compound represented by the following general formula (1).

[Chemical Formula 5]

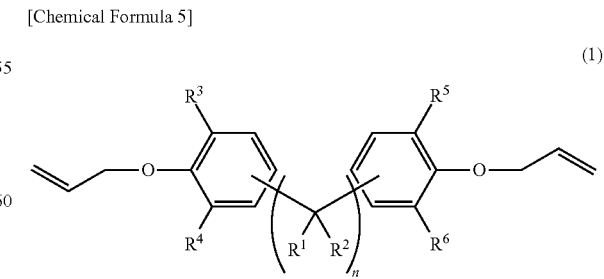

{in the formula, $R^1$ and $R^2$ each independently represents a hydrogen atom, an alkyl group having a carbon number of 1 to 6, a cycloalkyl group having a carbon number of 4 to 6, or an aryl group having a carbon number of 6 to 14, or $R^1$ and $R^2$ are combined to form a cycloalkane having a carbon number of 3 to 12; and $R^3$, $R^4$, $R^5$, and $R^6$ each independently represents a hydrogen atom, an alkyl group having a carbon number of 1 to 10, a cycloalkyl group having a carbon number of 4 to 6, or an aryl group having a carbon number of 6 to 14; and n represents an integer of 0 or 1}.

Specifically, such compounds include bisphenol-A diallyl ether, bisphenol-F diallyl ether, 2,6,2',6'-tetramethyl bisphenol-A diallyl ether, 2,2'-diallyl bisphenol-A diallyl ether, 2,2'-di-t-butyl bisphenol-A diallyl ether, 3,3',5,5'-tetramethyl biphenyl-4,4'-diallyl ether, 2,2-diisopropyl bisphenol diallyl ether, 4,4'-ethylidene bisphenol diallyl ether, 4,4'-cyclohexylidene bisphenol diallyl ether, 4,4'-(1-α-methylbenzylidene) bisphenol diallyl ether, 4,4'-(3,3,5-trimethyl cyclohexylidene) bisphenol diallyl ether, 4,4'-(1-methylbenzylidene) bisphenol diallyl ether, and the like.

A biphenyl-type diallyl ether having an aromatic ring and having two allyl ether groups may be, specifically, 2,2'-biphenyl diallyl ether, tetramethyl biphenyl diallyl ether, and the like.

Further, a compound obtained by allylic etherification of a polyphenol, such as a cresol novolak resin, a phenol novolak resin, etc., may also be used.

An aliphatic polyallyl ether having two or more allyl ether groups, specifically, 1,5-pentanediol diallyl ether, 1,6-hexanediol diallyl ether, 1,9-nonanediol diallyl ether, 1,10-decanediol diallyl ether, neopentyl glycol diallyl ether, glycerin triallyl ether, trimethylolpropane triallyl ether, pentaerythritol tetraallyl ether, and the like, may be used.

An alicyclic diolefin having two allyl ether groups may be, specifically, 1,4-cyclohexane dimethanol diallyl ether, tricyclo[$5.2.1.0^{2,6}$] decanedimethanol diallyl ether, and the like.

The above-mentioned raw material compound (substrate) having a carbon-carbon double bond is oxidized using the hydrogen peroxide as an oxidant, to thereby produce an epoxy resin. The amount of the hydrogen peroxide used is not limited, but is selected from a range of 0.5 to 10 equivalent, and preferably 0.8 to 2 equivalent, relative to the amount of the carbon-carbon double bond of the allyl ether for epoxidizing.

The method applied for producing an epoxy resin by oxidizing the raw material compound (substrate) having a carbon-carbon double bond using hydrogen peroxide is not limited, but the following method in which reaction is performed in the presence of acetonitrile is preferable because the epoxy resin can be obtained efficiently without containing catalyst residues.

The concentration of acetonitrile in the reaction system used in the epoxy compound production method according to the present aspect of the disclosure, is limited to the range of 0.6 to 5 mol/L, during the progress of the reaction. As the reaction progresses, the concentration of the acetonitrile in the reaction system decreases. When the concentration in the reaction system becomes less than 0.6 mol/L, the yield decreases, whereas when the concentration exceeds 5 mol/L, the epoxidation selectivity of the hydrogen peroxide tends to decrease, and the cost for the production increases, and thus, either of them is not preferable. Therefore, the initial concentration at the start of the reaction is set in the above concentration range, the concentration is monitored during the progress of the reaction, and the concentration is controlled by adding acetonitrile before the concentration becomes lower than the above lower limit value, to an extent not to exceed the upper limit value. Preferably, the concentration is in the range of 0.7 to 2 mol/L. The total amount of the acetonitrile used in the reaction is preferably 0.6 to 2 times (molar ratio), and more preferably 0.65 to 1.85 times, of the total amount of the hydrogen peroxide.

The amount of acetonitrile charged at the start of the reaction is preferably in the range of 1.2 to 5 molar equivalent, and more preferably in the range of 2 to 4 molar equivalent, on the basis of the number of double bonds regarding the organic compound having a carbon-carbon double bond. When the amount is less than 1.2 molar equivalent, the yield decreases, whereas when the amount exceeds 5 molar equivalent, the epoxidation selectivity of the hydrogen peroxide tends to decrease, and the cost increases, and thus, either of them is not preferable. The amount of acetonitrile charged at the start of the reaction should satisfy the concentration range in the reaction system during the progress of the reaction, i.e., 0.6 to 5 mol/L. There is no particular limitation as to where the acetonitrile used in the present aspect of the disclosure comes from. The acetonitrile may be a marketed product, a by-product generated during the production of acrylonitrile by the Sohio process, or the like.

In the epoxy compound production method according to the present aspect of the disclosure, the reaction liquid preferably has a pH of 9 to 11, and more preferably 9.5 to 11, and still more preferably 10 to 11. When the pH is less than 9, the reaction speed decreases, whereas when the pH exceeds 11, the reaction progresses too rapidly and becomes dangerous, and further, the yield thereby decreases. When a compound having two carbon-carbon double bonds is used for the organic compound having carbon-carbon double bonds, the pH of the reaction system may have influences on the yield and the selectivity of the diepoxide, but in the range of 10 to 11 is preferable because both the yield and the selectivity can be increased.

The basic salt compound used for adjusting the pH in the reaction system may be, for example, an inorganic basic salt such as potassium carbonate, potassium bicarbonate, potassium hydroxide, sodium hydroxide, cesium hydroxide, etc., or an organic basic salt such as potassium methoxide, potassium ethoxide, sodium methoxide, sodium ethoxide, tetramethylammonium hydroxide, etc., and potassium hydroxide and sodium hydroxide are preferable because they have high solubility to water and alcohol, and they have superior reaction property. Among them, potassium carbonate, potassium bicarbonate, potassium hydroxide, sodium hydroxide, potassium methoxide, potassium ethoxide, sodium methoxide, and sodium ethoxide are preferable in the point that the pH adjustment is easy.

The above-mentioned basic salt compound can be used as an aqueous solution or an alcohol solution. The alcohol used for the solvent in the alcohol solution may be methanol, ethanol, propanol, butanol, etc., and the solvent is preferably the same as the reaction solvent described below. Preferably, the basic salt compound solution is added while the hydrogen peroxide aqueous solution is added, so that the pH of the reaction liquid is prevented from decreasing below 9, while the hydrogen peroxide aqueous solution is added, and the addition is preferably performed while maintaining the temperature of the reaction liquid in the range of 20 to 100° C., and more preferably in the range of 25 to 60° C.

In the epoxy compound production method, the reaction temperature is normally in the range of 20 to 100° C., and preferably in the range of 25 to 60° C. The reaction time depends on the reaction temperature, and cannot be generally determined, but the reaction time is normally within the range of 4 to 48 hours, and preferably within the range of 4.5 to 28 hours.

After the reaction is complete, the reaction liquid is diluted with purified water, or the reaction liquid is neutralized in accordance with needs, by adding an acid such as sulfuric acid thereto, and then, diluted with purified water. Thereafter, the solvent is distilled away, and the residue is extracted by an organic solvent such as ethyl acetate. Accordingly, the organic layer is separated from the water layer, and the organic layer is concentrated, and thereafter, subjected to an ordinary method of distillation, chromatographic separation, recrystallization, sublimation, etc., to thereby extract the obtained epoxy compound.

The epoxy resin obtained as above is subjected to measurement to measure the epoxy equivalent thereof and determine the epoxy group concentration. Thereafter, the epoxy resin is reacted with (meth)acrylic acid to obtain the objective epoxy (meth)acrylate resin. Either or both of the acrylic acid and the methacrylic acid can be used.

This reaction is performed by mixing 0.2 to 1.3 mol of an unsaturated group-containing monocarbonic acid per mol of an epoxy group, and reacting the mixture normally at the temperature in the range of 50° C. to 150° C., for approximately 1 to 15 hours. As a catalyst, for example, amines such as triethylamine, dimethylbutylamine, tri-n-butylamine, quaternary salts such as tetramethyl ammonium salt, tetraethyl ammonium salt, tetrabutyl ammonium salt, benzyltriethyl ammonium salt, etc., a quaternized phosphonium salt, phosphines such as triphenylphosphine, etc., imidazoles such as 2-methylimidazole, 2-ethyl-4-methylimidazole, etc., may be exemplified.

The solvent used in the reaction may be alcohols, such as methanol, ethanol, propanol, butanol, ethylene glycol, methyl cellosolve, ethyl cellosolve, etc., esters such as methyl cellosolve acetate, ethyl cellosolve acetate, etc., keton-based solvents such as methyl ethyl ketone, methyl isobutyl ketone, etc., lactone-based solvent such as γ-butyrolactone, etc., aromatic compounds such as benzene, toluene, chlorobenzene, dichlorobenzene, etc., and the like. Further, polymerizable diluting monomer, such as styrene, methacrylic acid methyl, etc., may also be used for the solvent.

At the time of reaction, a polymerization inhibitor such as hydroquinone, methyl hydroquinone, hydroquinone monomethyl ether, 4-methyl quinoline, phenothiazine, etc., may also be present in the reaction system. In addition, in order so suppress the polymerization reaction by an unsaturated bond, the reaction may be performed under the flow of gas, such as air. At this time, in order to prevent the oxidation reaction by air, antioxidant such as 2,6-di-t-butyl 4-methyl phenol, etc., may be used together.

In accordance with needs, other thermoplastic resin and thermosetting resin may be added as a binder, as far as the properties of the epoxy (meth)acrylate resin are not inhibited thereby. By containing a resin functioning as a reactive elastomer, a film forming property can be increased. Thus, when the adhesive is used as a film-shaped adhesive, the reactive elastomer is preferably contained in the binder resin. The term reactive means that the reactive elastomer contains a functional group which reacts with other resin component (including epoxy (meth)acrylate resin) in an anisotropic conductive film. Further, the elastic modulus of the cured resin can be reduced to increase the adhesive force, and to decrease the residual stress at the time of connection. Therefore, the connection reliability can be increased.

The material for the reactive elastomer is not particularly limited, but a material having a film forming property can be used. Such a material may be, for example, phenoxy resin, polyester resin, polyurethane resin, polyimide resin, polybutadiene, polypropylene, styrene-butadiene-styrene copolymer, polyacetal resin, polyvinyl butyral resin, acrylic rubber, butyl rubber, chloroprene rubber, polyamide resin, acrylonitrile-butadiene copolymer, acrylonitrile-butadiene-methacrylic acid copolymer, acrylonitrile-butadiene-styrene copolymer, polyvinyl acetate resin, nylon, styrene-isoprene copolymer, styrene-butylene-styrene block copolymer, and the like. These material can be used independently, or as a mixture of two or more of them.

The mixing amount of the reactive elastomer is not particularly limited, but is preferably 10 parts by mass or more and 300 parts by mass or less, relative to the total of 100 parts by mass of the epoxy (meth)acrylate resin and the polymerization initiator. When the mixing amount is not more than the upper limit value, the fluidity of the conductive film increases, resulting in the increase in connection reliability. Further, wettability to various adherends increases, resulting in the increase in adhesion property. Whereas, when the mixing amount is not less than the lower limit value, the film forming property as a conductive film increases. Further, the elasticity of a cured material increases, resulting in various advantages such as the increase in adhesion property to various adherends, and the increase in connection reliability after the thermal shock test.

A preferable example of the reactive elastomer is an acrylic rubber. The acrylic rubber may be a polymer or a copolymer having at least one of acrylic acid, acrylic acid ester, methacrylic acid ester, and acrylonitrile, as a monomer component. Among them, a copolymer-based acrylic rubber formed by further reacting the carboxylic acid in the acrylic rubber with glycidyl acrylate or glycidyl methacrylate containing a glycidyl ether group, is preferable.

Specifically, the acrylic rubber may be, for example, a compound represented by the following general formula (2).

[Chemical Formula 6]

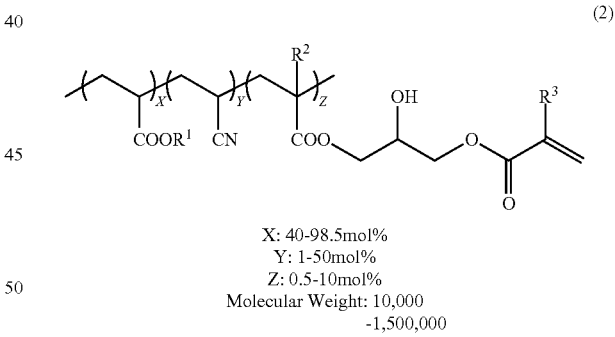

X: 40-98.5mol%
Y: 1-50mol%
Z: 0.5-10mol%
Molecular Weight: 10,000
-1,500,000

In the general formula (2), $R^1$ represents hydrogen, a methyl group, an ethyl group, a propyl group, or a butyl group; $R^2$ represents hydrogen, a methyl group, an ethyl group, a propyl group, or a butyl group; $R_3$ represents hydrogen, a methyl group, an ethyl group, a propyl group, or a butyl group; $R^1$, $R^2$, and $R^3$ being the same or different. In the general formula (2), X is 40 mol % or more and 98.5 mol % or less, Y is 1 mol % or more and 50 mol % or less, and Z is 0.5 mol % or more and 20 mol % or less. Further the acrylic rubber represented by the general formula (2) has a molecular weight of, for example, 10000 or more and 1500000 or less. By using the acrylic rubber represented by the general formula (2), the adhesive property and the connection reliability can be further increased.

Such other thermoplastic resin and thermosetting resin are also preferable to have lower chlorine concentration and lower bromine concentration. The sum of the total chlorine atom concentration and the total bromine atom concentration is preferably 300 mass ppm or less, relative to the total amount of the resin functioning as a binder. The concentration is more preferably 50 mass ppm or less, and still more preferably 10 mass ppm or less. Namely, according to the first aspect, the sum of the total chlorine atom concentration and the total bromine atom concentration, relative to the total amount of the binder resin constituting the conductive adhesive, is preferably 300 mass ppm or less, more preferably 50 mass ppm or less, and still more preferably 10 mass ppm or less.

The epoxy (meth)acrylate resin may be polymerized by a polymerization initiator described below.

As for the polymerization initiator, a thermal polymerization initiator is preferable. Specific examples of the thermal polymerization initiator is not limited, and known initiators can be widely used. Specifically, preferable examples are benzoyl peroxide, diisopropyl peroxycarbonate, t-butylperoxy-2-ethylhexanoate, t-butyl peroxyneodecanoate, t-hexyl peroxypivalate, 1,1,3,3-tetramethyl butyl peroxy-2-ethylhexanoate, t-butyl peroxypivalate, t-butyl peroxy-2-ethylhexanoate, t-hexyl peroxy isopropyl monocarbonate, dilauroyl peroxide, diisopropyl peroxydicarbonate, di-(4-t-butylcyclohexyl) peroxydicarbonate, 2,2-di-(4,4-di-(t-butylperoxy) cyclohexyl) propane, 1,1-di-(t-hexylperoxy)-3,3,5-trimethyl cyclohexane, and the like.

Depending on the intended purpose, a photopolymerization initiator can be used for the polymerization initiator. Specific examples of the polymerization initiator is not limited, known initiators can be widely used. Specifically, preferable examples are polymerization initiators such as 1-hydroxycyclohexyl phenyl ketone, 2,2'-dimethoxy-2-phenylacetophenone, 1-(4-isopropylphenyl)-2-hydroxy-2-methylpropane-1-one, 2-hydroxy-2-methyl-1-phenylpropane-1-one, 2-methyl-1-[4-(methylthio)phenyl]-2-morpholinopropane-1-one, 2,4,6-trimethylbenzoyl diphenylphosphine oxide, 2-(benzyl)-2-dimethylamino-1-(4-morpholinophenyl)butane-1-one, 1-[4-(2-hydroxyethoxy)-phenyl]-2-hydroxy-2-methylpropane-1-one, etc., hexaaryl biimidazole compounds, triazine compounds, aminoacetophenone compounds, combinations of a sensitizing dye and an organic borate compound, quinone compounds, titanocene compounds, oxadiazole compounds, glyoxy ester compounds, bisacyl phosphine oxide compounds, and the like.

Needless to say, the lower chlorine, bromine content is preferable for these polymerization initiators.

The conductive filler used in the conductive adhesive according to the first aspect is, preferably, a particle or a fiber made of at least one kind of metal, or an alloy of a plurality of kinds of metal selected from a group of gold, silver, copper, nickel, aluminum, and palladium; a metal particle or fiber the surface of which is plated with gold, palladium, or silver; a resin core ball having a resin ball plated with nickel, gold, palladium, or silver; a carbon or graphite particle or fiber; or the metal particle, the core ball, the carbon or graphite particle the surface of which is coated with insulation resin thin film. However, the conductive filler is not limited to these, and can be others as far as the conductivity can be obtained, and the adhesive property is not largely damaged (too large to be used as an adhesive). The shape of the conductive filler is not limited. In case of a particle, the shape can be various such as spherical, plate-like (flat), rod-shape, etc. A preferable particle diameter is in the range of 5 nm to 20 µm. Here, the particle diameter is the number median particle diameter D50 (median diameter), obtained by measuring diameters using laser diffraction-scattering when the particle diameter is 500 nm or more, and using dynamic light scattering when the particle diameter is less than 500 nm. In case of a fiber, a fiber having a diameter of 0.1 to 3 µm, a length of 1 to 10 µm, and an aspect ratio of 5 to 100, is preferable.

The content of the binder resin in the conductive adhesive is preferably 5 to 90% by mass, relative to the total amount of the resin and the conductive fillers, in view of the printability and the conductivity of the cured conductive layer. In order to uniformly dispersing the metal particles in the binder resin, the content is preferably 5 to 50% by mass, more preferably 10 to 40% by mass, and particularly preferably 15 to 30% by mass. In order to have an anisotropic conductive adhesive capable of achieving anisotropic conductive connection, the content of the binder resin is preferably 80 to 99.1% by mass.

The conductive adhesive according to the first aspect can be prepared to have an appropriate viscosity in accordance with the printing method or coating method to an element, substrate, etc., by selecting the type and the amount of the conductive filler and the binder resin containing the epoxy (meth)acrylate resin, and using a diluent in accordance with needs. For example, in case of screen printing, an organic solvent having a boiling point of 200° C. or more is preferably used as a diluent, and such an organic solvent may be diethylene glycol monomethyl ether acetate, diethylene glycol monobutyl ether acetate, diethylene glycol monobutyl ether, etc. Although depending on a printing method or a coating method, the conductive adhesive preferably has a viscosity, measured at 25° C. by a rheometer, in the range of 5 Pa·s to 2000 Pa·s, and more preferably in the range of 10 Pa·s to 1000 Pa·s, and further more preferably in the range of 20 Pa·s to 500 Pa·s.

In addition to the above, in accordance with needs, a dispersion aid can be used in the conductive adhesive according to the first aspect. The dispersion aid may be an aluminum chelate compound such as diisopropoxy (ethyl acetoacetate) aluminum; titanate ester such as isopropoxy triisostearoyl titanate; aliphatic polyvalent carboxylic acid ester; unsaturated fatty acid amine salt; surfactant such as sorbitan monooleate; or polymer such as polyester amine salt, polyamide, etc. Further, inorganic and organic pigment, a silane coupling agent, a leveling agent, a thixotropic agent, an antifoaming agent, may also be mixed.

The conductive adhesive according to the first aspect may be prepared by uniformly mixing the mixed components by a mixing machine such as a grinding machine, propeller agitator, kneader, roll, pot mill, etc. The preparing temperature is not particularly limited, and can be an ambient temperature.

The conductive adhesive according to the first aspect can be printed or coated on a substrate by any selected method, such as screen printing, gravure printing, dispensing, etc. When an organic solvent is used as a diluent, after the printing or coating, the organic solvent is volatized at an ambient temperature or by heating. Then, depending on the type of the resin and the polymerization initiator, the resin is heated to be cured. For example, when t-butyl peroxy-2-ethylhexanoate is used as a polymerization initiator, the resin is heated to be cured at 80 to 120° C. for 5 to 30 minutes, to thereby form a conductive pattern at a necessary portion of the substrate surface.

Accordingly, an electronic device having a substrate on which a semiconductor element, a solar panel, a thermoelectric element, a chip part, a discrete part, or a combination of these are mounted, can be formed using the conductive adhesive according to the first aspect. Further, an electronic device in which a wiring pattern of a film antenna, a keyboard membrane, a touch panel, a RFID antenna is formed and connected to a substrate, using the conductive adhesive according to the first aspect, can be formed.

FIG. 1(a) and FIG. 1(b) show examples of an electronic device for which the conductive adhesive according to the first aspect is used. FIG. 1(a) shows an example that a chip part is mounted on a substrate, and FIG. 1(b) shows an example of a film antenna.

In FIG. 1(a), a chip 100 is provided with a terminal 102 and the chip 100 is mounted. A wiring 106 is formed on the substrate 104. When the 100 is mounted on the substrate 104, a conductive adhesive 108 according to the first aspect is charged between the terminal 102 and the wiring 106 to assure the conduction between the terminal 102 and the wiring 106, also to adhere the chip 100 to the substrate 104.

In the example of FIG. 1(b), the conductive adhesive according to the first aspect is printed on the surface of a film 110 to form an antenna pattern 112. Thereby, a film antenna is constituted.

(Second Aspect of Disclosure)

An anisotropic conductive film according to the second aspect of the disclosure comprises conductive particles and a binder resin, the binder resin comprising an epoxy (meth)acrylate resin, the epoxy (meth)acrylate resin being formed by adding a (meth)acrylic acid to an epoxy compound having the sum of a total chlorine atom concentration and a total bromine atom concentration of 300 mass ppm or less, and 0.1 to 20% by mass of conductive particles being dispersed in the binder resin.

The sum of a total chlorine atom concentration and a total bromine atom concentration is preferably 50 mass ppm or less, and more preferably 10 mass ppm or less.

The epoxy (meth)acrylate resin used in the second aspect is the same as that in the first aspect. The binder resin can also contain other thermoplastic resin and thermosetting resin, same as the first aspect. The sum of the total chlorine atom concentration and the total bromine atom concentration in the total amount of other binder resins is preferably 300 mass ppm or less, more preferably 50 mass ppm or less, and still more preferably 10 mass ppm or less. Namely, The sum of the total chlorine atom concentration and the total bromine atom concentration in the total amount of the binder resins constituting the anisotropic conductive film according to the second aspect is preferably 300 mass ppm or less, more preferably 50 mass ppm or less, and still more preferably 10 mass ppm or less.

The conductive particle used in the anisotropic conductive film according to the second aspect is, preferably, a particle made of at least one kind of metal, or an alloy of a plurality of kinds of metal selected from a group of gold, silver, copper, nickel, aluminum, and palladium; a metal particle the surface of which is plated with gold, palladium, or silver; a resin core ball having a resin ball plated with nickel, gold, palladium, or silver; a carbon or graphite particle; or the particle as mentioned above the surface of which is coated with an insulation resin thin film. However, the conductive particle is not limited to these, and can be others as far as the conductivity can be obtained, and the adhesive property is not largely damaged (too large to be used as an adhesive). The shape of the conductive particle is not limited, and can be various such as spherical, plate-like (flat), rod-shape, etc. Among them, the spherical shape is preferable. A preferable particle diameter depends on the gap between the adjacent terminals (bumps) or wirings for the electronic components to be connected, but is ½ or less, preferably ⅕ or less, still more preferably 1/10 or less, relative to the gap between the adjacent terminals (bumps) or wirings, and can be in the range of 5 nm to 20 μm. Here, the particle diameter is the number median particle diameter D50 (median diameter), obtained by measuring diameters using laser diffraction-scattering when the particle diameter is 500 nm or more, and using dynamic light scattering when the particle diameter is less than 500 nm.

The content of the conductive particle dispersed in the binder resin constituting the anisotropic conductive film is 0.1 to 20% by mass, and preferably 0.2 to 10% by mass. If the content is less than 0.1% by mass, the conductive reliability as an anisotropic conductive film decreases, whereas if the content exceeds 20% by mass, the anisotropic conductivity decreases.

The anisotropic conductive film according to the second aspect can be prepared to have an viscosity appropriate for adhesion of elements, substrate, etc., by selecting types and amounts of conductive particles and a binder resin containing the epoxy (meth)acrylate resin, and by using a diluent in accordance with needs.

In addition to the above, in accordance with needs, a dispersion aid can be used in the anisotropic conductive film according to the second aspect. The dispersion aid may be an aluminum chelate compound such as diisopropoxy (ethyl acetoacetate) aluminum; titanate ester such as isopropoxy triisostearoyl titanate; aliphatic polyvalent carboxylic acid ester; unsaturated fatty acid amine salt; surfactant such as sorbitan monooleate; or polymer such as polyester amine salt, polyamide, etc. Further, inorganic and organic pigment, a silane coupling agent, a leveling agent, a thixotropic agent, an antifoaming agent, may also be mixed.

The anisotropic conductive film may be produced by dispersing the conductive particles in the binder resin, and forming a film of the obtained dispersion on a release film. In order to disperse the conducive particles in the binder resin, a mixing device such as a grinding machine, propeller agitator, kneader, roll, pot mill, etc., may be used for uniform mixing. The preparing temperature is not particularly limited, and can be an ambient temperature.

Similar to the conventional anisotropic conductive film, the anisotropic conductive film according to the second aspect is arranged between electrodes to be connected of a flexible substrate, a rigid substrate, an electronic component (chip part), etc., and subjected to heating, UV irradiation, etc., while the pressure is applied between the electrodes. Thereby, the anisotropic conductive film can be used for the anisotropic conductive connection for electrically and mechanically connecting the electrodes, and an electronic device having an anisotropic conductive connection body can be produced at a low temperature. Here, the anisotropic conductive connection means a connection in which the connection between the opposing electrodes (vertical direction) are conductive, while the connection between the adjacent electrodes (lateral direction) is insulated.

The pressure applied during the connecting step is in the range of 0.2 MPa to 5.0 MPa, preferably 0.5 MPa to 3.0 MPa, and more preferably 0.8 MPa to 1.5 MPa. The heating temperature during the connecting step is in the range of 80° C. to 170° C., preferably 90° C. to 150° C., and more preferably 100° C. to 130° C., but the temperature can be appropriately selected depending on the pyrolysis character of the used initiator. The time for pressurization under heating in the connecting step is in the range of 3 to 30 seconds, and can be appropriately selected depending on the pyrolysis character of the used initiator. When the epoxy (meth)acrylate according to the present aspect is used as a binder, the anisotropic conductive film can be cured at a lower temperature compared to the anisotropic conductive film using the epoxy-based binder (the heating temperature during the connecting step being 170° C. to 190° C.)

Figure 2:
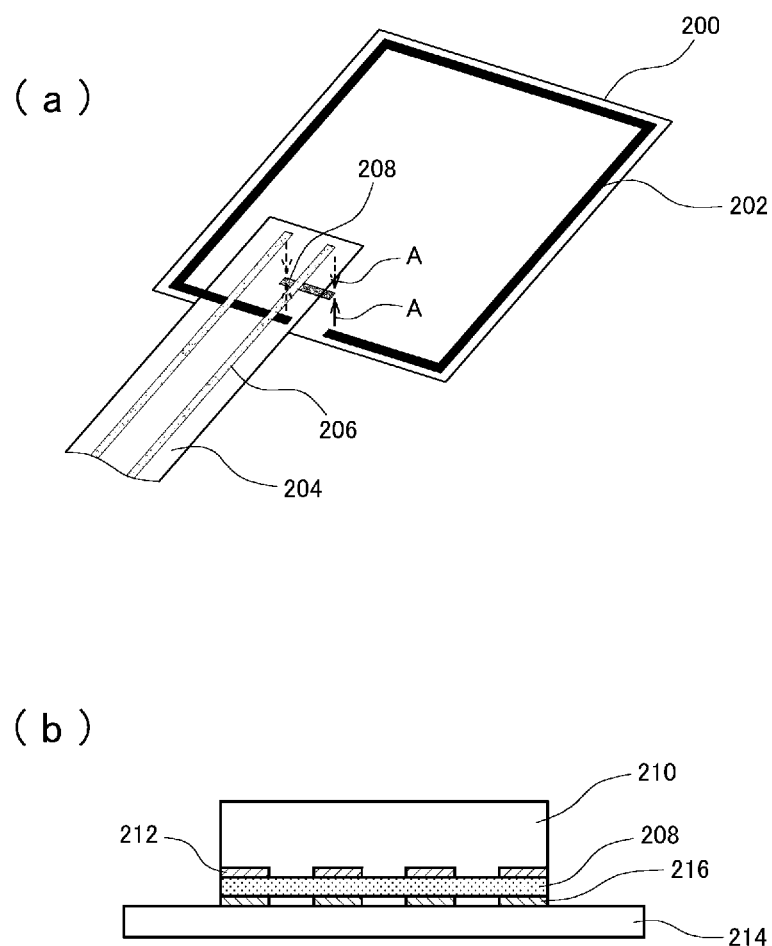
FIG. 2 is a view showing an example of an electronic device in which an anisotropic conductive film according to the second aspect of the disclosure is used.

FIG. 2(a) and FIG. 2(b) show examples of electronic devices using the anisotropic conductive film according to the second aspect. FIG. 2(a) shows an example of anisotropic conductive connection between flexible substrates, and FIG. 2(b) shows an example of anisotropic conductive between the chip part and wirings on the substrate.

In FIG. 2(a), a first circuit formation film 200, i.e., a flexible substrate, is provided with a first circuit 202, and a second circuit formation film 204 is provided, on its surface opposing to the first circuit formation film 200 (first circuit 202), with a second circuit 206. The first circuit 202 and the second circuit 206 can be formed by, for example, the conductive adhesive according to the first aspect.

The anisotropic conductive film 208 according to the second aspect is arranged between the first circuit 202 and the second circuit 206, and the first circuit formation film 200 and the second circuit formation film 204 are pressed in the direction of the arrow A in FIG. 2(a) while the films are heated. The pressure and the temperature at this time are those described above. Thereby, the ends of the first circuit 202 and the ends of the second circuit 206 are connected to have anisotropic conductive connection, by the anisotropic conductive film 208.

In FIG. 2(b), a chip 210 is provided with terminals 212, a substrate 214 on which the chip 210 is mounted, is provided with wirings 216. When the chip 210 is mounted on the substrate 214, the anisotropic conductive film 208 is arranged between the surface of the chip 210 provided with the terminals 212 and the surface of the substrate 214 provided with the wirings 216, and the chip 210 and the substrate 214 are pressed to each other while being heated. The pressure and the temperature at this time are those described above. Thereby, the terminals 212 of the chip 210 and the wirings 216 of the substrate 214 are connected to have anisotropic conductive connection, by the anisotropic conductive film 208.

EXAMPLES

Hereinafter, specific examples of the present disclosure will be explained. The examples are described below for the purpose of easy understanding of the present disclosure, and the present disclosure is not limited to these examples.

The conductive fillers used in the present examples are following silver particles.

AgC-239: silver particle (plate-like), median particle diameter being 2 to 15 μm, manufactured by Fukuda Metal Foil & Powder, Co., Ltd.

N300: silver powder (flat), median particle diameter being 0.3 μm, manufactured by Tokusen Co., ltd.

T5A-A01: silver particle (spherical), median particle diameter being 20 nm, manufactured by DOWA Electronics Materials Co., Ltd.

The median particle diameter of the AgC-239 and N300 are obtained by spherical approximation.

Synthesis Example 1

Synthesis of Bisphenol-A Diglycidylether

Bisphenol-A diallyl ether (50.1 g, 0.162 mol), acetonitrile (26.6 g, 0.648 mol), and ethanol (265.1 g, 5.75 mol) were charged in a 1 L egg-plant shaped flask.

Next, while a saturated potassium hydroxide aqueous solution ($KOH/H_2O$=110 mg/100 mL) was added to prevent the pH from dropping below 9, 45% hydrogen peroxide aqueous solution (53.9 g, 0.713 mol) was dropped in two hours, using a dropping funnel. Thereafter, the addition of the saturated potassium hydroxide aqueous solution was continued to prevent the reaction temperature from exceeding 30° C., and to bring the pH to 10.5 after two hours from the completion of the dropping of the hydrogen peroxide aqueous solution. Further, while the pH was controlled at 10.5, the solution was stirred at 30° C. for two hours.

Subsequently, acetonitrile (13.3 g, 0.324 mol) was dropped (added) in two hours. At the same time, the 45% hydrogen peroxide aqueous solution (53.9 g, 0.713 mol) was dropped (added) in four hours. Then, while the pH was controlled at 10.5, the solution was further stirred at 30° C. for four hours, and the reaction was complete.

After the reaction was complete, the solvent was distilled away under reduced pressure. Subsequently, purified water (150.0 g) and toluene (150.0 g) were added to the reaction liquid and stirred. Then, the liquid was left to stand still to separate the liquid into an organic layer and a water layer, and the water layer was removed. Then, the organic layer was washed with 5% sodium sulfite aqueous solution (200.0 g) three times, and with purified water (100.0 g) twice.

Thereafter, the solvent was distilled away under reduced pressure, and colorless and transparent liquid (48.5 g, GC purification: 94%) was obtained. The epoxy equivalent of the obtained liquid was measured to be 180 g/eq. The total chlorine atom concentration was 1 ppm, and the total bromine atom concentration was lower than the detection limit.

The epoxy equivalent, the total chlorine atom concentration, and the total bromine atom concentration were obtained by the following methods, respectively.

<Epoxy Equivalent>

The epoxy equivalent was obtained in compliant with JIS-K7236. A specimen weighed to have 0.1 to 0.2 g was charged in a conical flask, and 10 mL of chloroform was added thereto and to dissolve the specimen. Then, 20 mL of acetic acid was added thereto, and subsequently, 10 mL of tetraethylammonium bromide acetic acid solution (obtained by dissolving 100 g of tetraethylammonium bromide in 400 mL of acetic acid) was further added. 4 to 6 drops of crystal violet indicator was added to the solution, and the solution was subjected to titration with 0.1 mol/L perchloric acid acetic acid solution. On the basis of the titration results, the epoxy equivalent was obtained using the following formula.

$$\text{Epoxy Equivalent(g/eq)}=(1000 \times m)/\{(V1-V0) \times c\}$$

m: weight of specimen (g)

V0: amount (mL) of perchloric acid acetic acid solution consumed for titration until the end point in the blank test V1: amount (mL) of perchloric acid acetic acid solution consumed for titration until the end point c: concentration of perchloric acid acetic acid solution (0.1 mol/L)

<Total Chlorine Atom Concentration and Total Bromine Atom Concentration>

The chlorine atom concentration and the bromine atom concentration were measured by subjecting the compound to be measured to combustion and degradation at a high temperature of 800° C. or more, and the degradation gas was absorbed in ultrapure water, etc., which was then subjected to ion chromatography to determine the quantity of the chlorine atom and the bromine atom (pretreatment combustion device AQF-100 (manufactured by Mitsubishi Chemical Analytech Co., Ltd.), gas adsorption device GA-100 (manufactured by Mitsubishi Chemical Analytech Co., Ltd.), ion chromatography system ICS-1000 (manufactured by Dionex Corporation)).

Synthesis Example 2

Synthesis of Bisphenol-F Diglycidylether

The bisphenol-A diglycidylether in Synthesis Example was changed to bisphenol-F diglycidylether (45.4 g, 0.162 mol), and others in the reaction were the same as those in Example 1.

The epoxy equivalent of the obtained colorless and transparent liquid (43.5 g, GC purification: 91%) was measured to be 169 g/eq. The total chlorine atom concentration was 1 ppm, and the total bromine atom concentration was lower than the detection limit.

Synthesis Example 3

Synthesis of 1,4-cyclohexanedimethanol diglycidyl ether 1,4-cyclohexanedimethanol diallyl ether (150.0 g, 0.669 mol), acetonitrile (109.6 g, 2.67 mol), potassium carbonate (27.8 g, 0.201 mol), and ethanol (202.4 g, 4.39 mol) were charged in a 1 L egg-plant shaped flask.

Then, 45% hydrogen peroxide aqueous solution (101.2 g, 1.34 mol) were dropped in three hours by a dropping funnel. After the dropping was complete, the solution was stirred at 30° C. in two hours.

Subsequently, 45% hydrogen peroxide aqueous solution (75.6 g, 1.00 mol) was dropped (added) in two hours, and after the dropping was complete, the solution was further stirred at 30° C. for 17 hours, and then, the reaction was complete. After the reaction was complete, purified water (150.0 g) and toluene (150.0 g) were added to the reaction liquid and stirred. Then, the liquid was left to stand still to separate the liquid into an organic layer and a water layer, and the water layer was removed. Then, the organic layer was washed with 5% sodium sulfite aqueous solution (200.0 g) three times, and with purified water (100.0 g) twice.

Thereafter, the solvent was distilled away under reduced pressure, and colorless and transparent liquid (154.3 g, GC purification: 92%) was obtained. The epoxy equivalent of the obtained liquid was measured to be 138 g/eq. The total chlorine atom concentration was 4 ppm, and the total bromine atom concentration was lower than the detection limit.

Synthesis Example 4

Synthesis of Epoxy Acrylate

Bisphenol-A diglycidylether (9.00 g, 0.05 equivalent) synthesized in Synthesis Example 1, acrylic acid (3.60 g, 0.05 mol), polymerization inhibitor 2,6-di-t-butyl-4-methoxyphenol (0.109 g, 0.5 mmol), and triphenylphosphine (0.03 g, 0.1 mmol), were charged in a 100 ml egg-plant shaped flask, which was then subjected to heating at 130° C. for 10 hours under air flow, to thereby obtain a viscous bisphenol-A epoxy acrylate. The total chlorine atom concentration was 0.7 ppm, and the total bromine atom concentration was lower than the detection limit.

Synthesis Example 5

Bisphenol-A diglycidylether (9.00 g, 0.05 equivalent) synthesized in Synthesis Example 1 and used in Synthesis Example 4 was changed to bisphenol-F diglycidylether (8.45 g, 0.05 equivalent) synthesized in Synthesis Example 2. Others in the reaction were the same as those in Synthesis Example 4, and bisphenol-F diglycidylether epoxy acrylate was obtained. The total chlorine atom concentration was 0.7 ppm, and the total bromine atom concentration was lower than the detection limit.

Synthesis Example 6

Bisphenol-A diglycidylether synthesized in Synthesis Example 1 and used in Synthesis Example 4 was changed to 1,4-cyclohexanedimethanol diglycidyl ether 6.40 g (0.05 equivalent) synthesized in Synthesis Example 3. Others in the reaction were the same as those in Synthesis Example 4, and 1,4-cyclohexanedimethanol epoxy acrylate was obtained. The total chlorine atom concentration was 2 ppm, and the total bromine atom concentration was lower than the detection limit.

Synthesis Example 7

Bisphenol-A diglycidylether synthesized in Synthesis Example 1 and used in Synthesis Example 4 was changed to 1,4-cyclohexanedimethanol diglycidyl ether 6.40 g (0.05 equivalent) synthesized in Synthesis Example 3. Also, acrylic acid used in Synthesis Example 4 was changed to methacrylic acid 4.30 g (0.05 mol). Others in the reaction were the same as those in Synthesis Example 4, and 1,4-cyclohexanedimethanol epoxy methacrylate was obtained. The total chlorine atom concentration was 2 ppm, and the total bromine atom concentration was lower than the detection limit.

Synthesis Example 8

Bisphenol-A diglycidylether synthesized in Synthesis Example 1 and used in Synthesis Example 4 was changed to 1,4-cyclohexanedimethanol diglycidyl ether 6.40 g (0.05 equivalent) synthesized in Synthesis Example 3. Also, the polymerization inhibitor 2,6-di-t-butyl-4-methoxyphenol was changed to phenothiazine (0.0016 g, 0.008 mmol). Others in the reaction were the same as those in Synthesis Example 4, and 1,4-cyclohexanedimethanol epoxy acrylate was obtained. The total chlorine atom concentration was 4 ppm, and the total bromine atom concentration was lower than the detection limit.

Comparative Synthesis Example 9

Bisphenol-A diglycidylether synthesized in Synthesis Example 1 and used in Synthesis Example 4 was changed to DENACOL EX216 L (1,4-cyclohexanedimethanol diglycidyl ether manufactured by Nagase ChemteX Corporation, epoxy equivalent 143, chlorine concentration 3914 ppm) 7.15 g, (0.05 equivalent). Also, acrylic acid used in Synthesis Example 4 was changed to methacrylic acid 4.30 g (0.05 mol). Others in the reaction were the same as those in Synthesis Example 4, and 1,4-cyclohexanedimethanol epoxy methacrylate was obtained. The total chlorine atom concentration was 2433 ppm, and the total bromine atom concentration was lower than the detection limit.

Examples 1 to 8, Comparative Example 1

The conductive particles and the epoxy (meth)acrylate resin prepared by each of the Synthesis Examples were charged, in the ratio shown in Table 1, in a disposal cup (Examples 1 to 8, Comparative Example 1), and mixed well to become uniform, using a spatula. Thereafter, PERBUTYL O (t-butyl peroxy-2-ethylhexanoate, manufactured by NOF Corporation) was added thereto, and further mixed. The mixture was taken out and subjected to mixing and defoaming using Planetary Centrifugal Vacuum Mixer "Thinky Mixer" (AWATORI RENTAROU) ARE-310 (manufactured by Thinky Corporation), to thereby prepare a conductive adhesive.

(1) Production of Circuit Sample

Figure 3:
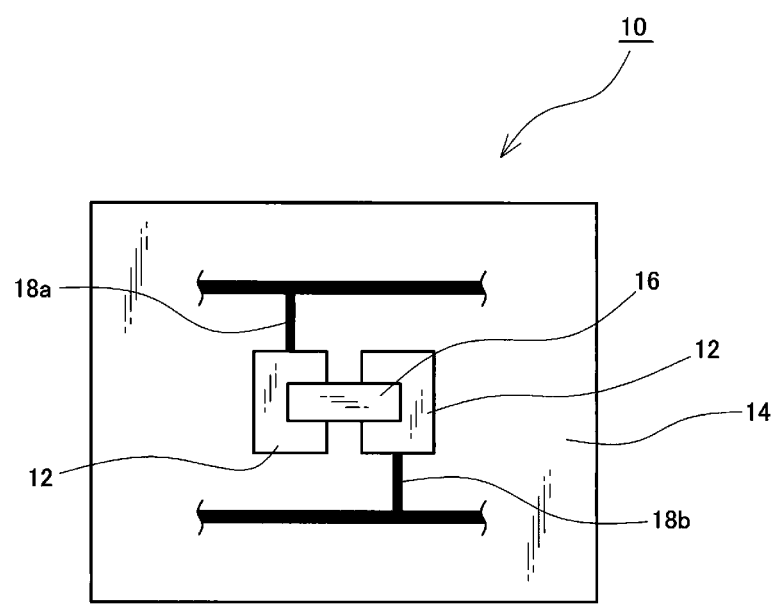
FIG. 3 is a view showing a configuration of a circuit sample used in an example.

Using the conductive adhesive obtained as above, a circuit sample was produced. FIG. 3 shows a structure of the produced circuit sample. In FIG. 3, a conductive adhesive 12 was printed, by stencil printing, on a copper surface of a copper-clad glass epoxy substrate 14, using a metal mask having a thickness of 75 μm (printed pattern had a shape capable of connecting the opposite electrodes of a chip resistor 16 to copper wirings (width: 0.5±0.2 mm) 18a and 18b). The chip resistor 16 plated with tin (thickness 2 μm) and having 2012 size (specifically, L (length), W (width), d (electrode width), t (thickness) (unit: mm) being 5.0±0.2, 2.5±0.2, 0.5±0.2, 0.5±0.2, respectively), was pressed on the printed pattern by hand, subjected to heating at 100° C. for 30 minutes to cure the adhesive to thereby connect the chip resistor 16 to the circuit substrate 14, and produce a circuit sample 10.

(2) Connection Resistance Measurement

The connection resistance (electric resistance between the copper wirings 18a and 18b)(Q) was measured by a tester (model: PC500a RS-232C, manufactured by SANWA). Five samples were measured, and the average of the measured values was obtained.

(3) Adhesion Strength Measurement

The adhesion strength was evaluated by using a bond tester (DAGE Series 4000, manufactured by Dage Co., Ltd. (GB), purchased from Dage Japan Co., Ltd.). The shear strength against the force applied in the horizontal direction was measured using the circuit sample 10. Five samples were measured, and the average of the measured values was obtained.

Figure 4:
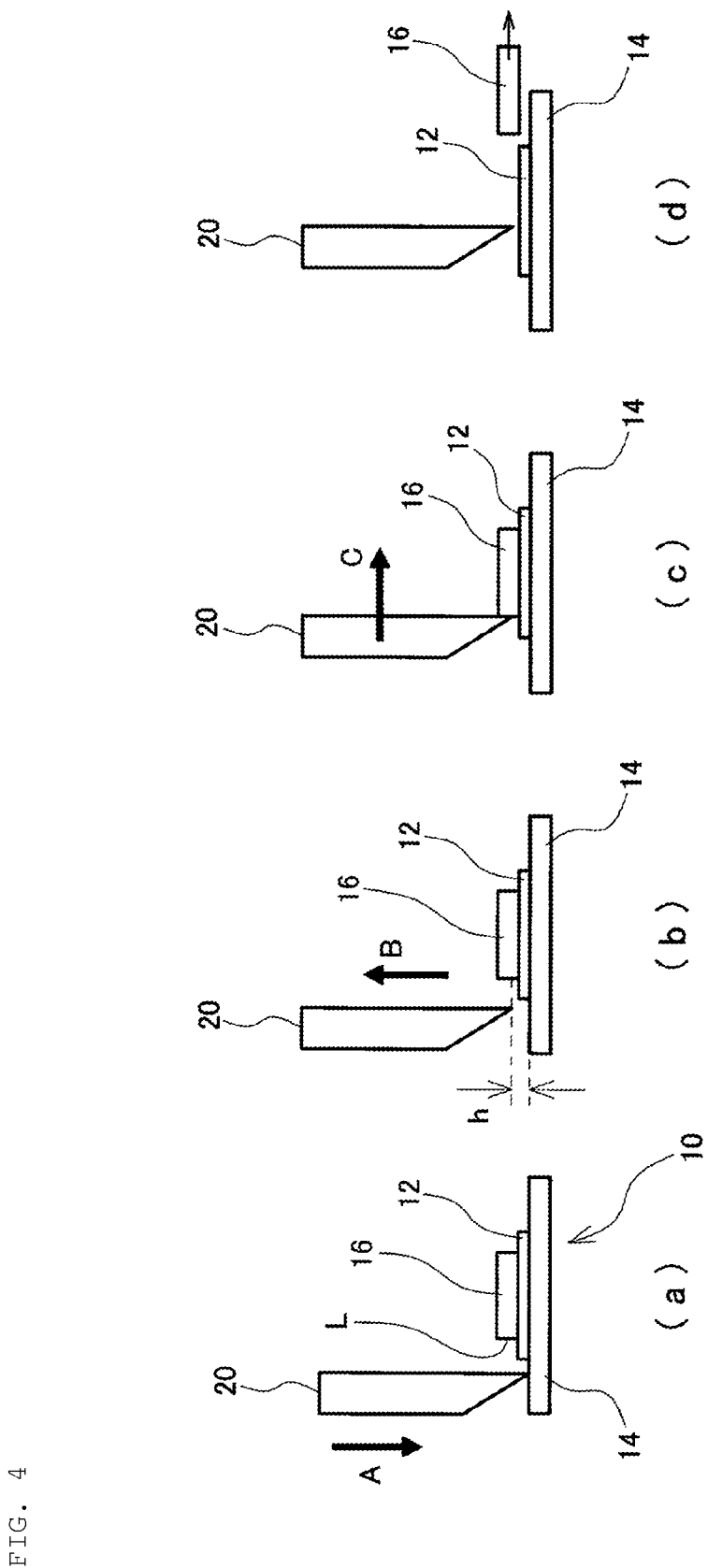
FIG. 4 is an explanatory view explaining a adhesion strength measurement method performed in an example.

Specifically, as shown in FIG. 4, the circuit sample 10 formed by adhering the chip resistor 16 to the substrate 14 with the conductive adhesive 12 at a room temperature was charged, and a shearing tool 20 provided with a load sensor was brought into contact with the side L (the left side in FIG. 4) of the chip resistor 16 and was pressed in the horizontal direction. Thereby, the strength when the adhesion surface between the chip resistor 16 and the substrate 14 was broken. The shearing tool 20 was moved downward in the direction of the arrow A until reaching the substrate surface (FIG. 4(a)). The position of the substrate was detected, and thereafter, the shearing tool 20 was moved upward in the direction of the arrow B to a preset height h (FIG. 4(b)). Thereafter, the shearing tool 20 presses the chip resistor 16 at any selected velocity in the horizontal direction (FIG. 4(c)). The load applied when the adhesion surface was broken was measured (FIG. 4(d)).

(4) Migration Test

The conductive adhesive prepared as above was printed on a ceramic substrate by a metal mask, heated at 80° C. for 30 minutes, and cured. Thereby, counter electrodes having a distance between electrodes of 2 mm, a width of 2 mm, a length of 2 cm, and a thickness of 20 μm were produced. A 10V voltage was applied between the electrodes, a drop of ion-exchanged water was dropped between the electrodes, and the time when a 100 mA current flowed was treated as a migration time. Five samples were measured, and the average of the measured values was obtained.

(5) Viscosity Measurement

The viscosities of the conductive adhesives according to Examples 1, 2, and 5 were measured using a rheometer Phisica MCR301, manufactured by Anton Paar GmbH. 0.5 mL of a sample was charged on a stage, and held between a cone and a plate (diameter 24 mm, cone angle 3°). The viscosity was measured under the conditions of measurement temperature: 25° C., number of rotations: 5 rpm. The viscosities of the conductive adhesives according to other Examples and the Comparative Example were measured using a cone-plate viscometer DV-II+Pro manufactured by Brookfield Engineering, under the conditions same as above.

The above results are shown in Table 1.

TABLE 1

| Composition (part by mass) | | Example 1 | Example 2 | Example 3 | Example 4 | Example 5 | Example 6 | Example 7 | Example 8 | Comparison Example 1 | Example 9 | Example 10 | Comparison Example 2 |
|---|---|---|---|---|---|---|---|---|---|---|---|---|---|
| Ag | AgC-239 | 80 | 80 | 85 | | | 60 | 80 | 80 | 80 | 20 | 20 | 20 |
| | N300 | | | | 80 | | 20 | | | | | | |
| | T5A-A01 | | | | | 75 | | | | | | | |
| Resin | Synthesis Example 4 | 20 | | | | | | | | | 20 | | |
| Solvent | Synthesis Example 5 | | 20 | | | | | | | | | | |
| Additive | Synthesis Example 6 | | | 15 | 20 | 25 | 20 | | | | | 20 | |
| | Synthesis Example 7 | | | | | | | | 20 | | | | |
| | Synthesis Example 8 | | | | | | | 20 | | | | | |
| | Comparison Synthesis Example 9 | | | | | | | | | 20 | | | 20 |
| | PERBUTYL O | 0.4 | 0.4 | 0.3 | 0.4 | 0.4 | 0.4 | 0.4 | 0.4 | 0.4 | | | |
| | PERHEXA TMH | | | | | | | | | | 1 | 1 | 1 |
| | Acrylic Rubber 1 (Synthesis Example 10) | | | | | | | | | | 50 | 50 | 50 |
| | Ethyl Acetate | | | | | | | | | | 37 | 37 | 37 |
| | Silica Filler | | | | | | | | | | 3 | 3 | 3 |

TABLE 1-continued

| Composition (part by mass) | | Example 1 | Example 2 | Example 3 | Example 4 | Example 5 | Example 6 | Example 7 | Example 8 | Comparison Example 1 | Example 9 | Example 10 | Comparison Example 2 |
|---|---|---|---|---|---|---|---|---|---|---|---|---|---|
| Evaluation | Connection Resistance Ω | 0.29 | 0.28 | 0.25 | 0.26 | 0.32 | 0.24 | 0.26 | 0.28 | 0.29 | | | |
| | Adhesion Strength N | 25 | 22 | 12 | 14 | 18 | 15 | 13 | 16 | 20 | | | |
| | Migration Time Min. | >3 | >3 | >3 | >3 | >3 | >3 | >3 | >3 | 0.1 | | | |
| | Viscosity Pa · s | >1000 | >1000 | 20 | 53 | 120 | 81 | 9 | 11 | 15 | | | |
| | Connection Resistance Increase Ratio % | | | | | | | | | | <5 | <5 | >10 |

As shown in Table 1, although the adhesion strengths of some Examples are slightly lower than that of Comparative Example, the connection resistances of Examples 1 to 8 are approximately same as that of Comparative Example 1.

On the other hand, with respect to the migration time, while Comparative Example 1 is 0.1 minute, all of Examples 1 to 8 exceed three minutes. This reveals that the conductive adhesive according to the present embodiment has a largely increased migration resistance (property of suppressing migration), leading to suppressing the deterioration caused by halogen at the adhered portion.

Synthesis Example 10

Polymerization of Acrylic Rubber

Butyl acrylate (40.0 g), ethyl acrylate (30.0 g), acrylonitrile (30.0 g), methacrylic acid (18.2 g), and ethyl acetate (260 g) were charged in a 1000 ml recovery flask provided with a mechanical stirrer and a Dimroth condenser. Azobisisobutyronitrile (0.65 g) dissolved in ethyl acetate (1.3 g) was dropped in the flask under nitrogen flow at 65° C. The azobisisobutyronitrile (0.65 g) dissolved in ethyl acetate (1.3 g) was dropped again when two hours, and four hours had passed thereafter, respectively. The solution was reacted for 10 hours, and almost all monomers disappeared. The obtained polymer had a molecular weight of 80000 (polystyrene conversion value by gel permeation chromatography (parts by mass PC)).

Glycidyl methacrylate (GMA) (30.0 g), polymerization inhibitor 2,6-di-t-butyl 4-methoxyphenol (0.148 g), triphenylphosphine (0.1 g) were added to the reaction liquid, which was subjected to heating at 80° C. for 30 hours under air flow. Thereby, acrylic rubber to which GMA was added, was synthesized.

Example 9

Epoxy acrylate resin (20 g) synthesized in Synthesis Example 4, acrylic rubber (50 g) synthesized in Synthesis Example 10, and ethyl acetate 10 g were added and dissolved. PERHEXA TMH (1,1-di(t-hexylperoxy)-3,3,5-trimethylcyclohexane, manufactured by NOF Corporation) (1 g) was added to this solution, to thereby prepare an adhesive solution. Ethyl acetate dispersion (10% by mass) (30 g) in which silica fillers (Aerosil R805, manufactured by Nippon Aerosil CO., LTD) were dispersed, was added to the adhesive solution and stirred. Further, AgC-239 (20 g) was mixed to the adhesive solution, which was subjected to ultrasonic dispersion. The dispersion liquid was coated on a separator (thickness 40 μm) which is a silicone-treated polyethylene terephthalate film, by a roll coater, and dried at 50° C. for 20 minutes, to thereby produce an anisotropic conductive film having a thickness of 20 μm.

Example 10

Instead of the epoxy acrylate resin of Synthesis Example 4 synthesized using the epoxy resin (bisphenol-A diglycidylether) obtained by Synthesis Example 1, the epoxy acrylate resin of Synthesis Example 6 synthesized using the epoxy resin (1,4-cyclohexanedimethanol diglycidyl ether) obtained by Synthesis Example 3, was used. Others were the same as Example 9, and the anisotropic conductive film was produced.

Comparative Example 2

An epoxy acrylate resin was synthesized same as Synthesis Example 4, except that jER828 (manufactured by Mitsubishi Chemical Corporation, chlorine atom concentration being 1710 ppm, total bromine atom concentration being less than 1 mass ppm) was used as an epoxy resin, instead of the epoxy acrylate resin of Synthesis Example 4 synthesized using the epoxy resin (bisphenol-A diglycidylether) obtained by Synthesis Example 1. An anisotropic conductive film was produced using thus obtained epoxy acrylate resin, and others were the same as Example 9.

Using a Methyl chloride as a solvent, adhesive portions were extracted from the films produced by Examples 9 and 10, and Comparative Example 2, and were subjected to solvent distillation, and drying to obtain a solid. Thereafter, the chlorine atom concentration of the obtained solid was measured. The measurement results are: Example 9 was 2 ppm, Example 10 was 1 ppm, whereas Comparison Example 2 was 362 ppm.

Using the produced anisotropic conductive film, a connection structure sample having a chip (1.7×17 mm, thickness: 0.5 μm) with gold bumps (area: 30×90 μm, space: 10 μm, height: 15 μm, number of bumps: 362), and a glass substrate with an Al circuit (thickness: 0.7 mm) having a wiring pitch 40 μm (line/space=30 μm/10 μm, line thickness: 10 μm), was produced by the method described below.

The anisotropic conductive film (2×19 mm) was adhered to the substrate with the Al circuit at 80° C., 0.98 MPa (10 kgf/cm$^2$), a separator was removed, and the bumps of the chip and the substrate with the Al circuit were aligned.

Subsequently, the obtained body was subjected to heating and pressurizing from above under the conditions of 120° C., 40 g/bump, 10 seconds, to fix the connection. The connection resistance immediately after the sample was produced, was measured. The measurement results revealed that all of Examples 9 and 10, and Comparative Example 2 had anisotropic conductive connection. Thereafter, the sample was further subjected to the treatment at the temperature of 85° C. and humidity of 85% for 200 hours (HH treatment), and the connection resistance was measured again. As shown in Table 1, the measurement results revealed that preferable anisotropic conductive connection was maintained in Examples 9 and 10, whereas the conductive connection was poor in Comparative Example 2. With respect to the connection resistance increase ratio (%) obtained by [(post HH treatment connection resistance)−(pre HH treatment connection resistance)]×100/(pre HH treatment connection resistance) were less than 5% in Examples 9 and 10, whereas 10% or more in comparative Example 2.

EXPLANATION ON NUMERALS

10 circuit sample, 12 conductive adhesive, 14 substrate, 16 chip resistor, 18a, 18b copper wiring, 20 shearing tool, 100 chip, 102 terminal, 104 substrate, 106 wiring, 108 conductive adhesive, 110 film, 112 antenna pattern, 200 first circuit formation film, 202 first circuit, 204 second circuit formation film, 206 second circuit, 208 anisotropic conductive film, 210 chip, 212 terminal, 214 substrate, 216 wiring

The invention claimed is:

1. A conductive adhesive comprising conductive fillers and a binder resin, the binder resin comprising an epoxy (meth)acrylate resin, and the epoxy (meth)acrylate resin being formed by adding a (meth)acrylic acid to an epoxy compound having the sum of total chlorine atom concentration and total bromine atom concentration of 300 mass ppm or less, wherein the epoxy compound comprises at least one allyl ether selected from the group consisting of bisphenol-F diallyl ether, 2,6,2',6'-tetramethyl bisphenol-A diallyl ether, 2,2'-diallyl bisphenol-A diallyl ether, 2,2'-di-t-butyl bisphenol-A diallyl ether, 3,3',5,5'-tetramethyl biphenyl-4,4'-diallyl ether, 2,2'-diisopropyl bisphenol diallyl ether, 4,4'-ethylidene bisphenol diallyl ether, 4,4'-cyclohexylidene bisphenol diallyl ether, 4,4'-(1-α-methylbenzylidene) bisphenol diallyl ether, 4,4'-(3,3,5-trimethyl cyclohexylidene) bisphenol diallyl ether, 4,4'-(1-methylbenzylidene) bisphenol diallyl ether, 2,2'-biphenyl diallyl ether, tetramethyl biphenyl diallyl ether, 1,5-pentanediol diallyl ether, 1,6-hexanediol diallyl ether, 1,9-nonanediol diallyl ether, 1,10-decanediol diallyl ether, neopentyl glycol diallyl ether, glycerin triallyl ether, trimethylolpropane triallyl ether, pentaerythritol tetraallyl ether, 1,4-cyclohexanedimethanol diallyl ether, tricyclo[$5.2.1.0_{2,6}$]decanedimethanol diallyl ether.

2. The conductive adhesive according to claim 1, wherein a raw material for the epoxy (meth)acrylate resin is an epoxy compound obtained by epoxidizing a carbon-carbon double bond of a raw material compound having a carbon-carbon double bond, using a peroxide as an oxidant.

3. The conductive adhesive according to claim 1, wherein the content of the binder resin in the conductive adhesive is 5 to 90% by mass.

4. The conductive adhesive according to claim 1, wherein the conductive filler is a particle or a fiber made of at least one kind of metal, or an alloy of a plurality of kinds of metal, the metal being selected from the group consisting of gold, silver, copper, nickel, aluminum, and palladium; a metal particle or fiber the surface of which is plated with gold, palladium, or silver; a resin core ball having a resin ball plated with nickel, gold, palladium, or silver; a carbon or graphite particle or fiber; or the metal particle, the core ball, the carbon or graphite particle the surface of which is coated with an insulation resin thin film.

5. The conductive adhesive according to claim 1, wherein the allyl ether is bisphenol-F diallyl ether or 1,4-cyclohexanedimethanol diallyl ether.

6. The conductive adhesive according to claim 1, wherein the allyl ether is 1,4-cyclohexanedimethanol diallyl ether.

7. The conductive adhesive according to claim 1, wherein the sum of total chlorine atom concentration and total bromine atom concentration is from 0.7 mass ppm to 300 mass ppm.

8. The conductive adhesive according to claim 1, wherein the sum of total chlorine atom concentration and total bromine atom concentration is 50 mass ppm or less.

9. The conductive adhesive according to claim 8, wherein the allyl ether is 1,4-cyclohexanedimethanol diallyl ether.

10. The conductive adhesive according to claim 8, wherein the sum of total chlorine atom concentration and total bromine atom concentration of 10 mass ppm or less.

11. An electronic device comprising a substrate on which a semiconductor element, a solar panel, a thermoelectric element, a chip part, a discrete part, or a combination thereof are mounted using the conductive adhesive according to claim 1.

12. An electronic device in which a wiring pattern of a film antenna, a keyboard membrane, a touch panel, a RFID antenna is formed and connected to a substrate, using the conductive adhesive according to claim 1.

13. An anisotropic conductive film comprising the conductive adhesive according to claim 1, wherein 0.1 to 20% by mass of conductive particles are dispersed in the binder resin.

14. The anisotropic conductive film according to claim 13, wherein the epoxy compound has the sum of a total chlorine atom concentration and a total bromine atom concentration of 50 mass ppm or less.

15. The anisotropic conductive film according to claim 13, wherein the epoxy (meth)acrylate resin is formed from an epoxy resin obtained by using a raw material compound having a carbon-carbon double bond, and by epoxidizing the carbon-carbon double bond using a peroxide as an oxidant.

16. The anisotropic conductive film according to claim 13, wherein the conductive particle used is at least one kind of metal, or an alloy of a plurality of kinds of metal, the metal being selected from the group consisting of gold, silver, copper, nickel, aluminum, and palladium; a metal particle the surface of which is plated with gold, palladium, or silver; a resin core ball having a resin ball plated with nickel, gold, palladium, or silver; a carbon or graphite particle; or the particle as mentioned above the surface of which is coated with an insulation resin thin film.

17. An electronic device in which electronic components are connected by anisotropic conductive connection, using the anisotropic conductive film according to claim 13.

* * * * *